United States Patent [19]

Murray

[11] Patent Number: 4,733,730
[45] Date of Patent: Mar. 29, 1988

[54] PLANTER GAUGE WHEEL

[75] Inventor: David L. Murray, Lee's Summit, Mo.

[73] Assignee: Deutz-Allis Corporation, Milwaukee, Wis.

[21] Appl. No.: 870,982

[22] Filed: Jun. 5, 1986

[51] Int. Cl.4 .................. A01B 29/06; A01B 35/28
[52] U.S. Cl. ................................ 172/519; 111/87; 152/327; 172/536
[58] Field of Search .............. 111/87, 86; 172/519, 172/536, 538, 539; 301/38, 39 T, 39 R, 41 R; 152/323, 327, 200, 233, 7, 187, 200, 185.1; 156/116

[56] References Cited

U.S. PATENT DOCUMENTS

| 2,209,967 | 8/1940 | Golod | 301/39 T |
| 2,698,566 | 1/1955 | Stough | 301/36 X |
| 4,405,007 | 9/1983 | Welter | 152/523 |
| 4,408,551 | 10/1983 | Keller | 111/87 |
| 4,430,952 | 2/1984 | Murray | 111/88 |
| 4,493,274 | 1/1985 | Robinson | 111/88 |

Primary Examiner—Richard J. Johnson
Attorney, Agent, or Firm—Charles L. Schwab

[57] ABSTRACT

The sidewall of the zero pressure tire of a combined gauge wheel and slicing disc assembly includes an annular sealing surface in axial engagement with the disc which is not pulled away from the disc by flexing of the tire tread during operation of the agricultural equipment on which the assembly is used.

6 Claims, 6 Drawing Figures

PLANTER GAUGE WHEEL

TECHNICAL FIELD

This invention relates to an atmospheric pressure rubber tire for a gauge wheel and more particularly to a rubber tired gauge wheel in combination with an earth penetrating disc at one lateral side thereof.

BACKGROUND OF THE INVENTION

A planter constructed according to my U.S. Pat. No. 4,430,952 issued Feb. 14, 1984 for Planter Gauge Wheels with Adjustable Equalizer Mechanism uses a combined gauge wheel and slicing disc assembly. The gauge wheel includes an atmospheric pressure rubber tire with a flexible tread and a special shaped lateral edge which bears against the associated slicing disc. This prior art gauge wheel and slicing disc assembly is also shown in FIGS. 1 and 2 of the drawings of this application for patent. In the prior art gauge wheel tire design, the disc contacting lip at one lateral side of the tire sealingly engages one lateral surface of the slicing disc and the tread wall flexes radially inward as the ground is engaged and then flexes radially outward as it rotates out of ground contact. This flexing of the tread wall prevents accumulation of dirt on the tread of the tire. However, it has been found that the radially outer edge of the lateral lip of the tire may be drawn away from the disc as the tread of the tire is flexed by engagement with the ground. This gap permits dirt to be forced between the disc and the tire, and upon a sufficient buildup of dirt, the tire is actually forced laterally off the rim. When this occurs, the gauge wheel is no longer able to perform its intended depth gauging function.

OBJECTS AND SUMMARY OF THE INVENTION

It is a primary object of this invention to provide an improved rubber tired gauge wheel and slicing disc assembly wherein one lateral side of the atmospheric pressure pneumatic tire will sealingly engage the disc in a manner preventing accumulation of dirt between the tire and the disc.

It is a further object of this invention to provide a combined gauge wheel and slicing disc assembly for a row crop planter of the type hereinbefore outlined which is relatively inexpensive, has long trouble-free service life, is simple to assemble, and is easily disassembled for replacement of worn parts.

The atmospheric pressure tire of this invention includes a flexible radially outer tread wall which at its axially opposite ends is joined to the radially outer ends of radially extending flexible sidewalls. Radially inner wall means of the tire have axially opposite end portions connected, respectively, to the radially inner ends of the sidewalls. An annular sealing surface is formed on an axially extending part of one of the sidewalls, which part is on the portion of the one sidewall which moves axially outward the greatest amount during bulging of the one sidewall when the tread surface engages the earth during a field operation. Preferably the radially outer edge of the annular sealing surface is not spaced further from the axis of the tire than the center of the radius of the bulge in the one sidewall. A radial abutment flange within the air cavity of the tire limits radially inward flexing of the tread wall of the tire and thus limits radially inward shifting of the center of the radius of the sidewall bulge toward the axis of the tire.

The sealing surface is axially positioned on the sidewall so that when the tire is installed on a rim and the rim is secured to a slicing disc, the sealing surface exerts a predetermined axial thrust against one axial side of said disc. Preferably, the sealing surface is a frusto-conical surface coaxial with the axis of the tire and tapers radially inwardly toward the central plane of the tire.

DETAILED DESCRIPTION OF THE DRAWINGS

Figure 1:
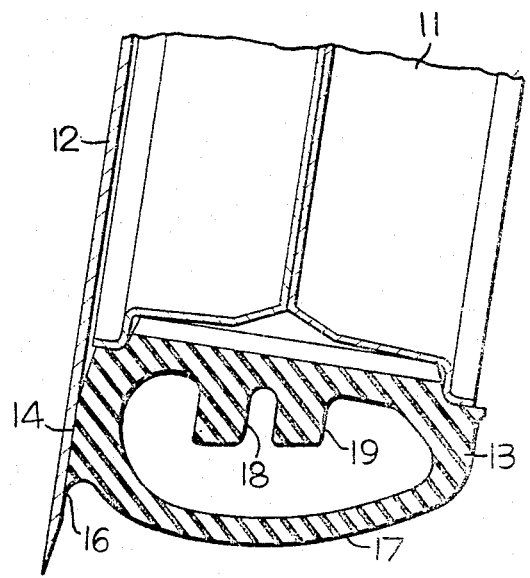
FIG. 1 is a partial section on a plane through the axis of a prior art gauge wheel and slicing disc assembly.
Figure 2:
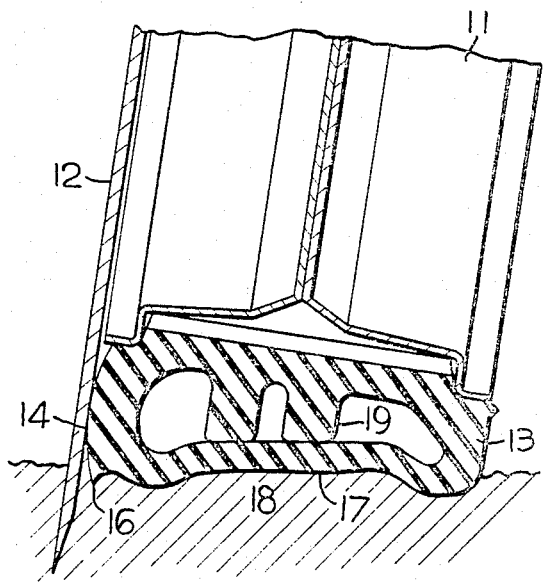
FIG. 2 is a view similar to FIG. 1 but with the disc and tire engaging the soil in a field operation.

In the prior art construction shown in FIGS. 1 and 2, a gauge wheel and disc assembly includes a tire rim 11 and slicing disc 12 which are coaxially secured to a wheel hub, not shown, in the manner illustrated in my U.S. Pat. No. 4,430,952. An atmospheric pressure pneumatic tire 13 mounted on the rim 11 includes a large contact surface 14 at one lateral side which engages one lateral side of the slicing disc 12. The outer edge 16 of the surface 14 has a diameter which is nearly equal to the diameter of the flexible tire tread 17 and such edge engages the disc 12 in the nonworking condition shown in FIG. 1; however, it has been found that in operating conditions, the flexing of the radially outer tread wall 17 in contacting the ground, as limited by radially outward extending annular abutment flanges 18, 19, causes laterally or axially outward bulging of the sidewall of the tire on which the flat contact surface 14 is formed, which causes the edge 16 to move away from the disc 12. This allows soil to accumulate between the surface 14 and the disc 12 and continued field operation causes sufficient soil to so accumulate that the tire 13 is actually pushed off the rim 11.

Figure 3:
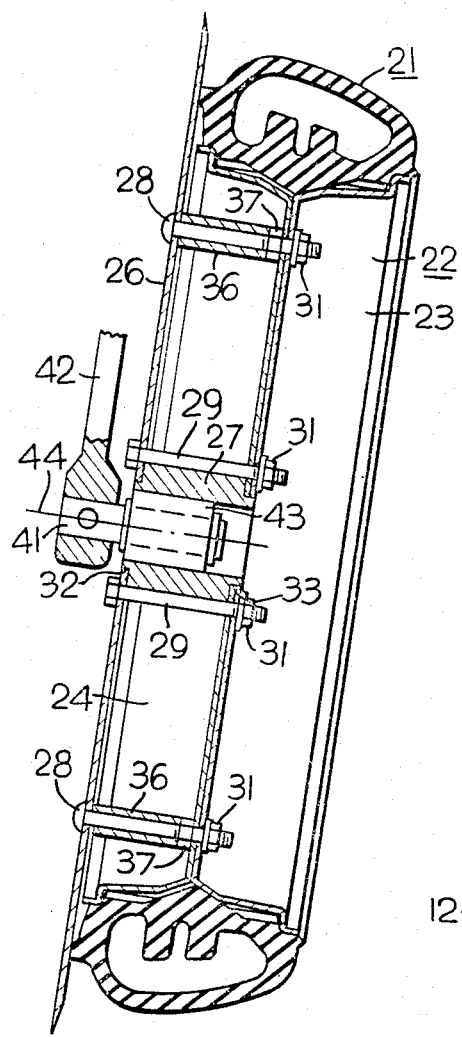
FIG. 3 is a section view on the axis of a gauge wheel and slicing disc of the present invention.

The beforementioned problem is solved by the present invention illustrated in FIGS. 3–6. As shown in FIG. 3, an atmospheric pressure pneumatic tire 21 is mounted on a rim 22 made up of two identical halves 23, 24 which are secured to a slicing disc 26 and hub 27 by carriage bolts 28, hex headed bolts 29 and nuts 31. The hub 27 has shoulders 32, 33 at its opposite axial ends which register with an annular central opening in the disc 26 and annular central openings in the rim halves 23, 24. When the nuts 31 are tightened, the confronting sides of the disc and rim half 24 are brought into frictional engagement with the axially outward facing surfaces of the hub 27 extending radially outward from the shoulders 32, 33 whereby the hub 27, disc 26 and rim 22 rotate as a unit. Spacing means in the form of bushings 36 and nuts 37 are placed on the carriage bolts 28 to provide proper spacing and maintain the tire receiving portion of the rim half 24 in a fixed juxtaposed position adjacent to or contacting the disc 26. The hub 27 of the gauge wheel and disc assembly is mounted on a shaft 41 secured to a mounting arm 42 by a sleeve bearing 43 for rotation about the wheel and disc axis 44.

Figure 4:
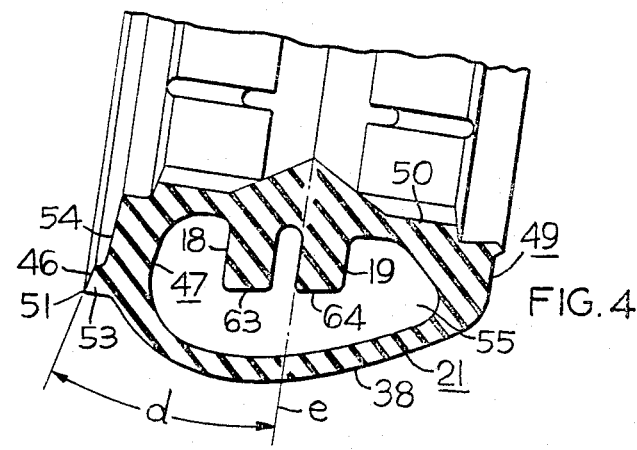
FIG. 4 is a partial section of a tire incorporating the present invention.
Figure 5:
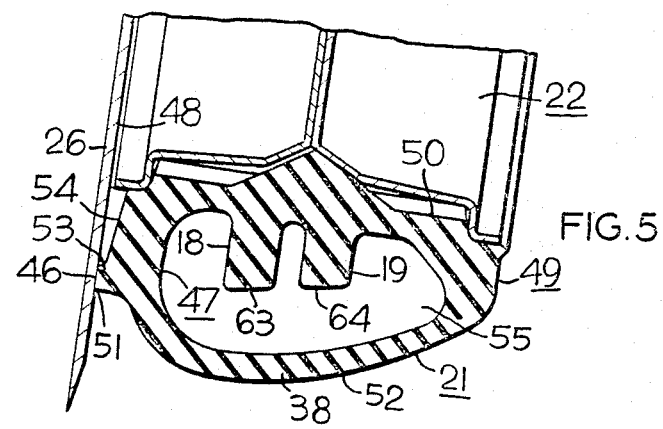
FIG. 5 is a partial section of a combined gauge wheel and slicing disc shown in FIG. 3.

Referring to FIG. 4, the tire 21 includes a flexible radially outer tread wall 38 which at its axially opposite ends is joined by the radially outer ends of radially extending sidewalls 47, 49. The radially inner ends of the sidewalls are joined to the axially outer ends of a radially inner wall 50 from which the abutment flanges 18, 19 extend. The inner air chamber 55 formed by the walls 38, 47, 49, and 50 is connected to the atmosphere by an opening, not shown. The atmospheric pressure tire 21 of this invention is provided with an axially outward facing frusto-conical sealing surface 46 which is spaced radially inward of the circumference of the tire. In the uninstalled condition of the tire, the sealing surface 46 is tapered at an angle "d" to the central plane "e" of the tire 21. The tire, rim and disc axis 44, shown in FIG. 3, is perpendicular to the central plane "e" of the tire 21 when installed on the rim 22. In the installed condition of the tire 21, as shown in FIG. 5, the sealing surface 46 and the lateral sidewall 47 of the tire 21 are pushed laterally (axially) inward by the disc 26 as the rim 22 and disc 26 are secured to the hub 27 by the bolts 28, 29 and nuts 31. In the installed condition of the tire, the sealing surface 46 flattens against the axially confronting side 48 of the disc 26 with its outer edge 51 exerting somewhat greater axial thrust per unit area against the disc than does the radially inner portion of the sealing surface 46. Instead of locating the sealing surface 46 radially outward near the diameter of the tread surface 52 of the tire 21, it is located radially inward at an area of the sidewall 47 which bulges laterally to the greatest extent during a field operation. In order to ensure that the sealing surface 46 is not drawn away from the disc 26 by the bulging of the sidewall, the sealing surface is formed on an annular and axially extending projection 53 which is disposed axially outward from the remainder of the outer surface 54 of the sidewall 47. In other words, the bulging of the sidewall 47 is accommodated by the pocket or cavity 56 between the sidewall surface 54 and the side 48 of the disc 26. It will also be noted that the center 61 of the radius 62 of curvature of the bulging sidewall surface 54 is not closer to the tire axis 44 than the sealing surface 46. As illustrated, the sealing surface 46 and the bulge center 61 are approximately the same distance from the axis 44 of the tire gauge wheel and disc assembly. It will also be noted that the sealing surface 46 is about the same distance from the axis 44 as the radially outward facing abutment surface 63 of the abutment flange 18. Engagement of the radially outward facing abutment surfaces 63, 64 on abutment flanges 18, 19 with the tread wall 38, limits movement of the center 61 of the radius of the bulge in the sidewall 47 radially inward toward the axis 44 which, if not limited, could result in reduced axial thrust by the sealing surface 46 against the disc 26.

Figure 6:
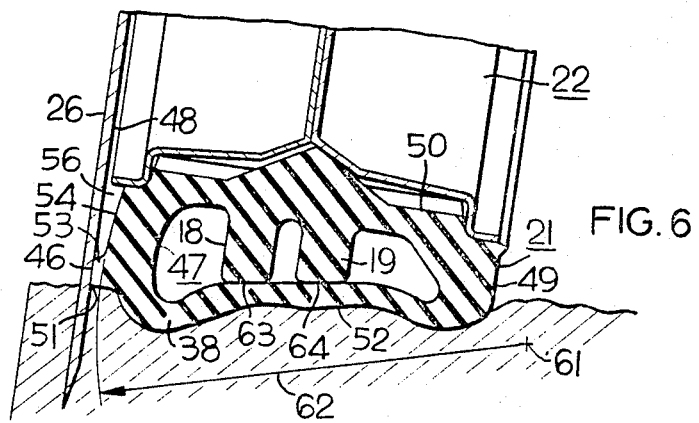
FIG. 6 is a view similar to FIG. 5 but with the slicing disc and tire engaging the ground in a field operation.

In operation, as illustrated in FIG. 6, the radially outer part of the disc 26, which extends radially outward beyond the tire 21, is penetrating the soil and slicing off a part of a seed trench sidewall to cover the seed deposited therein. The flexing tread wall 38 exerts force in axially opposite directions thus causing the sealing surface 46 to exert greater sealing force against the surface 48 of the disc. This is in marked contrast to the prior art of FIGS. 1 and 2 in which the bulging sidewall causes the outer edge 16 of the sealing surface 14 to move away from the side of the disc 12.

In conservation farming practices, crop residue and stubble are left on the soil surface. In order to afford greater resistance to stubble or other relatively hard items from being pushed between the sealing surface 46 and the disc 26, it is desirable to fasten the sealing surface 46 to the surface 48 of the disc 26 by a suitable water resistant adhesive or cement to form a strong bond therebetween. If the tire should become damaged and need to be replaced, it can be cut away from the disc and the residue on the disc can be removed by an appropriate shop tool.

Although the gauge wheel tire 21 is of special design, the other components of the gauge wheel and disc assembly are either commercially available parts or are inexpensive to manufacture. The parts are also easy to assemble and disassemble. The bolts 29 and nuts 31 hold the disc 26 and rim halves 23, 24 on the wheel hub 27, and the bolts 28, spacers 36, nuts 37 and nuts 31 rigidly hold the disc 26 in a predetermined adjacent relation to the rim 22, thereby preventing relative axial movement between the disc 26 and the confronting axial edge of the rim half 24.

The embodiments of the invention in which an exclusive property or privilege is claimed are defined as follows:

1. A combined gauge wheel and slicing disc for agricultural equipment comprising:
    a wheel rim,
    a disc coaxially secured to said wheel rim for rotation therewith and having an earth penetrating portion extending radially outward of said rim, said disc being closely adjacent to one lateral edge of said wheel rim and
    a zero pressure pneumatic tire mounted on said rim including
        a flexible tread wall and
        a flexible sidewall having
            an axially extending annular projection coaxial with said rim,
            an axial facing annular sealing surface on said annular projection, said annular sealing surface being spaced radially outward from said rim a distance greater than the radial width of said annular sealing surface and said annular projection extending axially from said sidewall a distance less the radial thickness of said sidewall, said annular sealing surface being in sealing engagement with said disc, the radially outer edge of said sealing surface lying radially inward in relation to the circumference of said tread wall and said sealing surface being on the part of said sidewall which tends to bulge axially outward the greatest as said tread wall flexes during engagement with the earth during operation of said equipment, whereby said outer edge remains in sealing engagement with said disc during such operation.

2. The combination of claim 1 wherein the uninstalled condition of said tire said annular sealing surface is conically shaped with said surface sloping radially inward toward the central plane of the tire.

3. The combination of claim 2 wherein said radially outer edge of said sealing surface exerts greater axial thrust per unit area against said disc than is exerted by other portions of said sealing surface.

4. The combination of claim 3 wherein said tire includes an internal radially extending flange with a radially outward facing abutment surface engageable with said tread wall to limit flexing of the latter, said abutment surface being approximately at the same radially outward position with respect to the axis of said rim as said annular sealing surface.

5. An atmospheric pressure pneumatic tire adapted for use in a combined gauge wheel and slicing disc assembly, said tire comprising:
a flexible radially outer tread wall presenting a tread surface,
a pair of axially spaced flexible sidewalls having radially outer portions connected to axially opposite ends of said tread wall, one of said sidewalls presenting an axially outward extending annular part spaced a substantial distance inwardly form said tread surface, said annular part projecting axially from said one sidewall a distance less than the axial thickness of said one sidewall,
radially inner wall means having axially opposite end portions connected to the radially inner portions of said said sidewalls, said end portions being adapted for engagement with wheel rim end flanges and being spaced radially inward of said axially outward extending annular part a substantial distance,
an axially outward facing frusto-conical sealing surface on said axially outward extending annular part diverging in the direction toward the other sidewall, said one sidewall having a predetermined radius of bulging caused by flexing of said tread wall during contact with the earth, the center of said radius of bulging being positioned radially from the axis of said tire a distance not less than the radius of the radially outer edge of said annular sealing surface, said axially outward extending annular part being on that radially intermediate portion of said one sidewall which shifts axially outward the most during bulging of said one sidewall.

6. A combined gauge wheel and slicing disc for agricultural equipment comprising:
a wheel rim,
a disc coaxially secured to said wheel rim for rotation therewith and having an earth penetrating portion extending radially outward of said rim, and
a zero pressure pneumatic tire mounted on said rim including
a flexible tread wall and
a flexible sidewall having an axial facing annular sealing surface bonded to said disc, the radially outer edge of said sealing surface lying radially in relation to the circumference of said tread wall and said sealing surface being on the part of said sidewall which tends to bulge axially outward the greatest as said tread wall flexes during engagement with the earth during operation of said equipment, whereby said outer edge remains in sealing engagement with said disc during such operation.

* * * * *

UNITED STATES PATENT OFFICE
CERTIFICATE OF CORRECTION

Patent No. 4,733,730              Dated   March 29, 1988

Inventor(s)          David L. Murray

It is certified that error appears in the above-identified patent and that said Letters Patent are hereby corrected as shown below:

Column 4, line 46, "than" should be inserted between "less" and "the";

Column 4, line 58, "in" should be inserted between "wherein" and "the";

Column 5, line 14, "form" should read "from";

Column 5, line 20, delete "said" (first occurrence).

Signed and Sealed this

Second Day of August, 1988

Attest:

DONALD J. QUIGG

Attesting Officer         Commissioner of Patents and Trademarks